US009468014B2

(12) United States Patent
Mosko

(10) Patent No.: US 9,468,014 B2
(45) Date of Patent: Oct. 11, 2016

(54) UTILITY-BASED CROSS LAYERING

(71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 105 days.

(21) Appl. No.: 14/505,393

(22) Filed: Oct. 2, 2014

(65) Prior Publication Data

US 2016/0100417 A1    Apr. 7, 2016

(51) Int. Cl.
*H04W 84/20* (2009.01)
*H04L 12/725* (2013.01)
*H04W 40/02* (2009.01)
*H04W 72/10* (2009.01)

(52) U.S. Cl.
CPC ............ *H04W 72/10* (2013.01); *H04L 45/306* (2013.01); *H04W 84/20* (2013.01); *H04W 40/02* (2013.01)

(58) Field of Classification Search
CPC ..... H04W 84/18; H04W 4/04; H04W 24/00; H04W 28/06; H04L 12/1854
See application file for complete search history.

(56) References Cited

U.S. PATENT DOCUMENTS 7,751,390 B2 * 7/2010 Mosko et al. ................ 370/389
7,966,419 B2 * 6/2011 Mosko et al. ................ 709/238

* cited by examiner

*Primary Examiner* — Ayaz Sheikh
*Assistant Examiner* — Debebe Asefa
(74) *Attorney, Agent, or Firm* — Shun Yao; Park, Vaughan, Fleming & Dowler LLP

(57) ABSTRACT

One embodiment provides a system that facilitates a large-scale mobile ad hoc network to adapt to specific needs of wireless nodes in a mobile wireless network. During operation, an intermediate node receives one or more packets that indicate a microutility and a relevance, where the microutility is based on a utility function specific to an application, and where the relevance indicates a priority of the one or more packets. The intermediate node combines the relevance of the one or more packets. The intermediate node aggregates the microutility and the relevance for the one or more packets, and determines the value of the one or more packets based on the aggregation of the microutility and the relevance. The intermediate node also determines an action for the one or more packets based on the determined value of a respective packet.

24 Claims, 8 Drawing Sheets

US 9,468,014 B2

UTILITY-BASED CROSS LAYERING

The subject matter of this application is related to the subject matter in the following applications:

U.S. patent application Ser. No. 14/161,410, entitled "GATEWAYS AND ROUTING IN SOFTWARE-DEFINED MANETS," by inventors Marc E. Mosko and Jose J. Garcia-Luna-Aceves, filed 22 Jan. 2014 (hereinafter "U.S. patent application Ser. No. 14/161,410");

U.S. patent application Ser. No. 14/161,406, entitled "SERVICE-ORIENTED ROUTING IN SOFTWARE-DEFINED MANETS," by inventors Marc E. Mosko and Jose J. Garcia-Luna-Aceves, filed 22 Jan. 2014 (hereinafter "U.S. patent application Ser. No. 14/161,406");

U.S. patent application Ser. No. 13/398,339, entitled "METHOD AND SYSTEM FOR NAME RESOLUTION ACROSS HETEROGENEOUS ARCHITECTURES," by inventors Spencer Sevilla, Priya Mahadevan, and Jose J. Garcia-Luna-Aceves, filed 20 May 2013 (hereinafter "U.S. patent application Ser. No. 15/823,188"); and U.S. patent application Ser. No. 11/428,429 (U.S. Pub. No. 2008/0002587 A1), entitled "SPECIFYING PREDICTED UTILITY OF INFORMATION IN A NETWORK," by inventors Juan Liu, Daniel H. Greene, Qingfeng Huang, James E. Reich, and Marc E. Mosko, filed 3 July 2006 (hereinafter "U.S. patent application Ser. No. 11/428,429");

the disclosures of which are herein incorporated by reference in their entirety.

BACKGROUND

1. Field

This disclosure is generally related to mobile ad hoc networks (MANETs). More specifically, this disclosure is related to the use of a utility-based cross layering mechanism within a mobile application specific network (MASNET) to facilitate large-scale MANETs that adapt to application needs.

2. Related Art

Typical ad hoc communication systems oftentimes require independent mobile users that can communicate in a non-centralized and self-organized fashion. For example, mobile ad hoc networks (MANETs) employ peer-to-peer a communication protocol to determine a path between two wireless nodes. Some key characteristics of MANETs include their ability to adapt to route changes due to mobility and the fact that they have no requirement for base stations or access points for node organization.

In theory, a MANET provides an ideal communication infrastructure to support disaster-relief and battlefield operations, emergency search and rescue missions, and many other mobile and distributed applications. However, these applications cannot be supported effectively in today's networks. This is mainly because the networks do not scale due to the excessive signaling incurred with an increasing number of nodes and applications. More specifically, MANET protocols distribute calculations (such as routing information) over many nodes hop-by-hop. To ensure protocol correctness and efficient operation, such as to avoid loops and excessive flooding, complex distributed algorithms are needed.

Centralizing resources has been proposed as an approach to address the growing needs of today's networks. One example is software defined networking (SDN), such as the one based on the OpenFlow protocol. In SDN, the "control plane" and the "data plane" are separated, and at least two control routers are used to instantiate state on the controlled network elements. With SDN, the topology of the network is virtualized at the controller nodes, which compute routes from sources to destinations according to a network-wide view, and can instantiate the "flow-state" at each switch of the network. Unfortunately, current SDN implementations compute paths based on the flow-states of the network, and thus cannot be applied to MANETs. Furthermore, SDN approaches have focused on static wired networks, where the controller is one logical link away from every switch, and thus do not address the dynamic placement of content and services.

Another approach is information centric networking (ICN) which is based on a publish-subscribe scheme where content objects are given names, all routing nodes act also as caching sites, and requests stating interest in specific content are disseminated in a way similar to route requests where the nearest sites with copies of the request content answer the requests. However, while ICN approaches allow a network to adapt to application needs by dynamically providing content and services from the nearest sites, ICN schemes are limited when applied to large-scale dynamic networks. Because ICN routing is performed based on object names, excessive signaling overhead is incurred. Also, the complexity of the nodes (e.g., routing nodes can be required to cache content and evaluate content requests to determine if requested content is stored locally) can incur additional signaling overhead.

SUMMARY

One embodiment provides a system that facilitates a large-scale mobile ad hoc network to adapt to specific needs of wireless nodes in a mobile wireless network. During operation, an intermediate node receives one or more packets that indicate a microutility and a relevance, where the microutility is based on a utility function specific to an application, and where the relevance indicates a priority of the one or more packets. The intermediate node combines the relevance of the one or more packets. The intermediate node aggregates the microutility and the relevance for the one or more packets, and determines the value of the one or more packets based on the aggregation of the microutility and the relevance. The intermediate node also determines an action for the one or more packets based on the determined value of a respective packet.

In some embodiments, the system computes, by a content producing node, the microutility for the one or more packets, where the microutility is based on a utility function specific to an application operating at the content producing node.

In some embodiments, the system computes, by a content requesting node, the relevance for the one or more packets, where the relevance further indicates the importance of the one or more packets to the content requesting node.

In some embodiments, responsive to determining one or more child nodes of the intermediate node, where the one or more child nodes each indicate a relevance corresponding to the one or more packets, the system sums the relevance indicated by the one or more child nodes.

In some embodiments, the system transmits the one or more packets to an upstream content producing node, where the one or more packets include the summed relevance indicated by the one or more child nodes.

In some embodiments, responsive to determining one or more child nodes of the intermediate node, where the one or more child nodes each indicate a relevance corresponding to the one or more packets, the system multiplies the microutility by the relevance indicated by the one or more child nodes.

In some embodiments, the intermediate node determines an action for the one or more packets based on the determined value of a respective packet, where the action is one of: forwarding the respective packet; dropping the respective packet; and delaying transmission of the respective packet.

In some embodiments, the system modifies an indicator of a priority of the one or more packets, where the modification decreases the value of the priority. The system also sends the one or more packets to one or more downstream nodes, where the one or more packets include the modified indicator of the priority of a respective packet.

BRIEF DESCRIPTION OF THE FIGURES

In the figures, like reference numerals refer to the same figure elements.

DETAILED DESCRIPTION

Figure 1A:
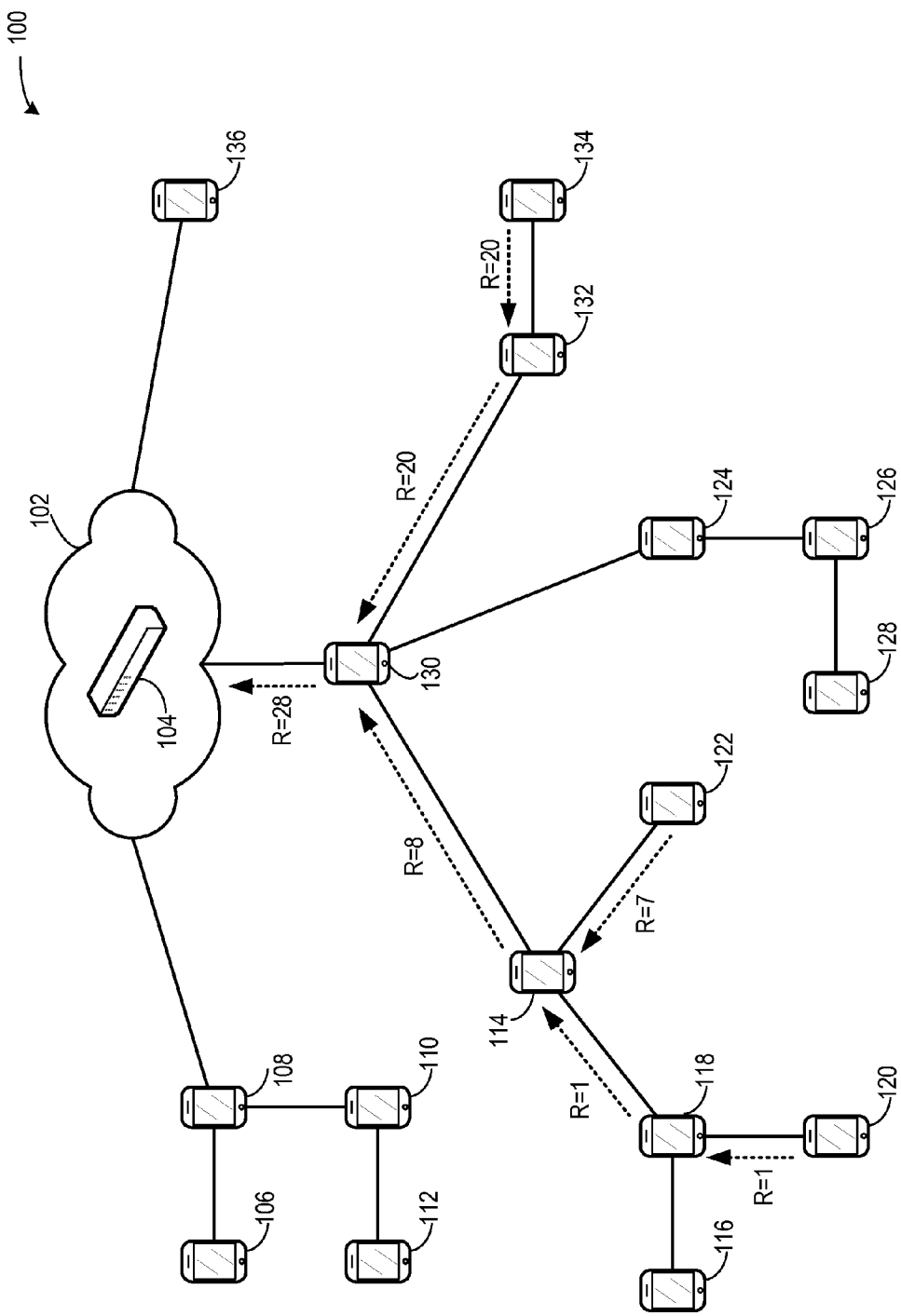
FIG. 1A presents a diagram illustrating an exemplary mobile application specific network (MASNET), where the system aggregates receiver relevance over the entire network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which employs a utility-based cross layering (UBCL) mechanism within a mobile application specific network (MASNET) to facilitate large-scale mobile ad hoc networks that adapt to application needs. Application-specific networking within a mobile wireless network is achieved by: incurring an overhead in the network that is smaller than that incurred by current routing schemes; allowing applications to access content and services from the most suitable locations, rather than fixed sites; and dynamically provisioning resources to satisfy the requirements of multiple concurrent applications while maximizing resource utilization and fairness. More specifically, a MASNET can include: 1) software defined MANETs (SDMs) based on an intelligent backbone infrastructure, which eliminate most of the signaling incurred for routing and channel access in dynamic wireless networks, reduce the complexity of network devices and software, and simplify the overall management of the network (as described in U.S. patent application Ser. Nos. 14/161,410 and 14/161,406); 2) an information discovery, exchange and storage (IDES) system which allows applications to discover and use services and content from the most convenient locations in the network based on the state of the network and application requirements, without resulting in network overhead and complexity explosion as the network size and dynamics increase (as described in U.S. patent application Ser. No. 15/823,188); and 3) utility-based cross-layering (UBCL) mechanisms that allow the network to engineer available resources with zero configuration in order to optimize how the network services applications. Thus, a MASNET integrates SDM, IDES, and UBCL based on an intelligent backbone infrastructure that minimizes complexity and maximizes the ability of the network to satisfy service demand.

In a MASNET that contains content publishing nodes (e.g., a producer node) and content subscriber nodes (e.g., a receiving node), UBCL operates by allowing the producer (or an application operating at the producer) to represent its data in utility models such that each individual data sample or content object can be ranked with its value to a receiving node. For example, the utility model, U, can be based on a function of the form:

$$U = a(f, d) \quad (1)$$

where f is a measure such as frequency (e.g., the number of updates for a particular time period) or bandwidth, and d is a distance in networking terms that measures how far an application is willing to send a corresponding data packet.

In UBCL, a receiving node can use a separate application-specific relevance function to express to the network its interest in the data stream of an application. A receiving or forwarding node aggregates receiver relevance over the entire network and determines how and where to forward individual packets or content objects. For example, the relevancy specification, R, can be based on a function of the form:

$$R = b(\vec{r}) \quad (2)$$

where $\vec{r}$ is a relevancy vector that represents a dynamic priority that specifies how the Quality of Service (QoS)

value of a packet changes as the packet travels through the network in a reverse path as the propagation of requested data.

More specifically, UBCL uses application-specific utility functions (e.g., equation (1)) at a content producer to assign a "microutility" to each packet, such that an ensemble of packets realizes an application-specific utility curve. A microutility assigns a dynamically changing priority to each individual content object in transit. At the same time, content subscribers designate a relevance to them for the data (e.g., equation (2)). The application utility and relevancy specification functions together inform the network about the importance of microutility-shaped traffic along different paths, and further allow the network to intelligently drop data or add resources when faced with congestion or delay. Content subscribers may also adjust their relevance to respond to congestion.

By comparison, in a push-based architecture, the content producer assigns both the microutility and the relevance by labeling each packet with a linear equation in time and space. An intermediate or forwarder node then evaluates the equation in order to determine the utility of the packet, such that the utility is based on the type of data being published and the relevance of that data to the receiving node. Such a system for information dissemination is described in U.S. application Ser. No. 11/428,429.

Thus, in embodiments of the present invention, each intermediate node or forwarder node in a MASNET needs to know the relevancy specification for a received data packet. This knowledge is provided by the backbone infrastructure. The microutility assigned to a data packet by the content producer is referred to as a microutility because each content object or data packet is assigned its own utility value. In-transit decisions are made based on these individual utility values. For example, if there is congestion in the network, a data packet of low priority is dropped. If there is a superior (e.g., faster, more reliable, etc.) channel available, high priority items will be sent along that channel. If a data packet is to be stored for transmission at a subsequent time, high priority data packets will receive preferred storage and retransmission.

The backbone controller also uses microutilities to choose where to allocate additional network resources or how to reconfigure the logical network topology through software defined mobile ad hoc network nodes. Microutilities can further adapt geocast methods to an information dissemination based on military role and purpose.

Each application at a content producer or publisher node is associated with a utility function that describes its importance, or the price that the application is willing to "pay" the network to deliver the quality of service required by the application. This price can vary based on time, location, role of the destination node, and other parameters. For example, in a military setting, an application may assign a large price to reach the Platoon Commander, and a small price to reach someone in another platoon. In this case, the network can give the application priority on the local MANET. In another example, an application may assign a large price to reach the company headquarter or command center, and a small price to reach the local platoon. In this case, the network can give priority on the backbone.

Similarly, a content producer or publisher node can advertise available content, while a content requester or subscriber node can offer to pay the network to have the content delivered. An application at the content producer specifies its utility function and allocates its budget. The utility function can be based on knowledge at the backbone or, in the military setting, in advanced radios, while the application budget can be allocated by various network elements based on the type of service required.

Network Architecture and Exemplary Communication

FIG. 1A presents a diagram illustrating an exemplary mobile application specific network (MASNET) 100, where the system aggregates receiver relevance over the entire network, in accordance with an embodiment of the present invention. MASNET 100 can include a backbone cloud 102 (which is hereinafter referred to as "backbone 102") and a set of mobile network nodes 106-136. More specifically, backbone 102 can include one or more controller nodes, such as a controller node 104, which communicate with each other via a wired or wireless network. At least some of mobile nodes 106-136 can communicate with backbone 102 over a wireless network, either directly or via a multi-hop path. For example, mobile node 108 is coupled to backbone 102 via a one-hop link, whereas mobile node 106 is coupled to backbone 102 via a two-hop link through node 108. Furthermore, each of mobile nodes 106-136 can be a content publisher node, a content subscriber node, a forwarder node, or an intermediate node.

During operation, controller node 104 collects state information from mobile nodes 106-136. The state information can include information relating to resources, storage, and services available on MASNET 150. Controller node 104 also collects information relating to a relevancy specification from various content subscriber nodes. During operation, content subscriber nodes designate a relevancy specification corresponding to their interest in a data stream (e.g., equation (2)). For example, mobile node 120 designates a relevancy specification of R=1 for a specific data stream. Mobile node 118 aggregates the relevancy specification of its child node (mobile node 120) and designates a relevancy specification of R=1. Mobile node 122 designates a relevancy specification of R=7 for the data stream. Mobile node 114 aggregates the relevancy specifications of its child nodes (mobile node 118 and mobile node 122), and in turn designates a relevancy specification of R=8. Mobile node 134 designates a relevancy specification of R=20. Mobile node 132 aggregates the relevancy specification of its child node (mobile node 134) and designates a relevancy specification of R=20. Mobile node 130 aggregates the relevancy specifications of its child nodes (mobile node 114 and mobile node 132) and designates a relevancy specification of R=28.

The aggregated receiver relevance specification of R=28 for the specific data stream is transmitted from mobile node 130 to backbone 102. Backbone 102 maintains the aggregated receiver relevance specification (e.g., equation (2)), and, in conjunction with a utility-specific function provided by a content publisher node (e.g., equation (1)), transmits the data stream back along a reverse path. Transmission decisions are made based on the microutility of the data stream or data packet, where the microutility assigns a dynamically-changing priority to each individual content object or data packet as it travels through the network.

Figure 1B:
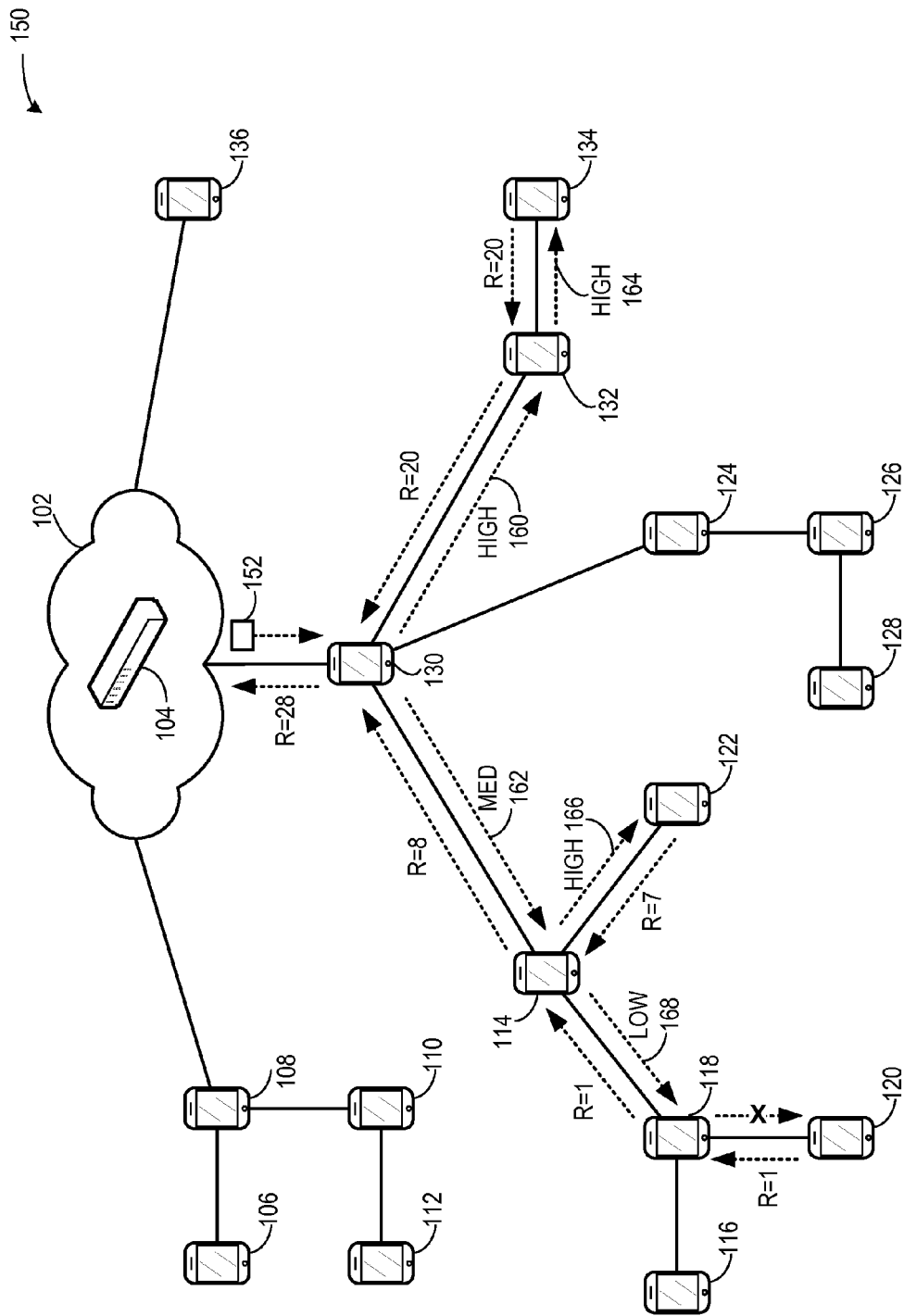
FIG. 1B presents a diagram illustrating an exemplary mobile application specific network (MASNET), where the system employs a microutility to assign a dynamically changing priority to a data packet as it travels through the network.

FIG. 1B presents a diagram illustrating an exemplary mobile application specific network (MASNET) 150, where the system employs a microutility to assign a dynamically changing priority to a data packet as it travels through the network. In response to a request for or an interest in a specific item of content, a packet 152 can be published and transmitted by a content producer node. Packet 152 can be produced and sent by any wireless node in MASNET 150 (not depicted). The content producer node that publishes packet 152 assigns a microutility to packet 152. As noted above, the microutility is based on an application-specific utility-based function applied by an application operating at the content producer node (e.g., equation 1). The microutility provides a dynamically-changing priority to packet 152 as it travels on the reverse path from backbone 102 to the various intermediate nodes.

In FIG. 1B, packet 152 has been received by backbone 102 and is transmitted from backbone 102 to mobile node 130. Each intermediate node that receives packet 152 aggregates the microutility and the relevancy specification to determine a transmission decision. For example, upon receiving packet 152, intermediate mobile node 130 aggregates the microutility and the relevancy specification, and determines that it should place a high priority 160 on transmitting packet 152 to mobile node 132 (which previously designated a data stream including packet 152 with a relevancy specification of R=20), and a medium priority 162 on transmitting packet 152 to mobile node 114 (which previously designated the data stream including packet 152 with a lower relevancy specification of R=8). Similarly, upon receiving packet 152, intermediate mobile node 132 aggregates that microutility and the relevancy specification, and determines that it should place a high priority 164 on transmitting packet 152 to mobile node 134 (which previously designated the data stream including packet 152 with a relevancy specification of R=20).

Additionally, upon receiving packet 152, intermediate mobile node 114 aggregates the microutility and the relevancy specification, and determines that it should place a high priority 166 on transmitting packet 152 to mobile node 122 (which previously designated the data stream including packet 152 with a relevancy specification of R=7), and a low priority 168 on transmitting packet 152 to mobile node 118 (which previously designated the data stream including packet 152 with a relevancy specification of R=1). At this point, based on the state of the network (e.g., congestion), intermediate mobile node 114 or intermediate mobile node 118 may decide to drop packet 152 based on the low relevancy specification of R=1 from mobile node 118 and mobile node 120, respectively (denoted, e.g., by the X in the transmission of packet 152 from mobile node 118 to mobile node 120).

Figure 2A:
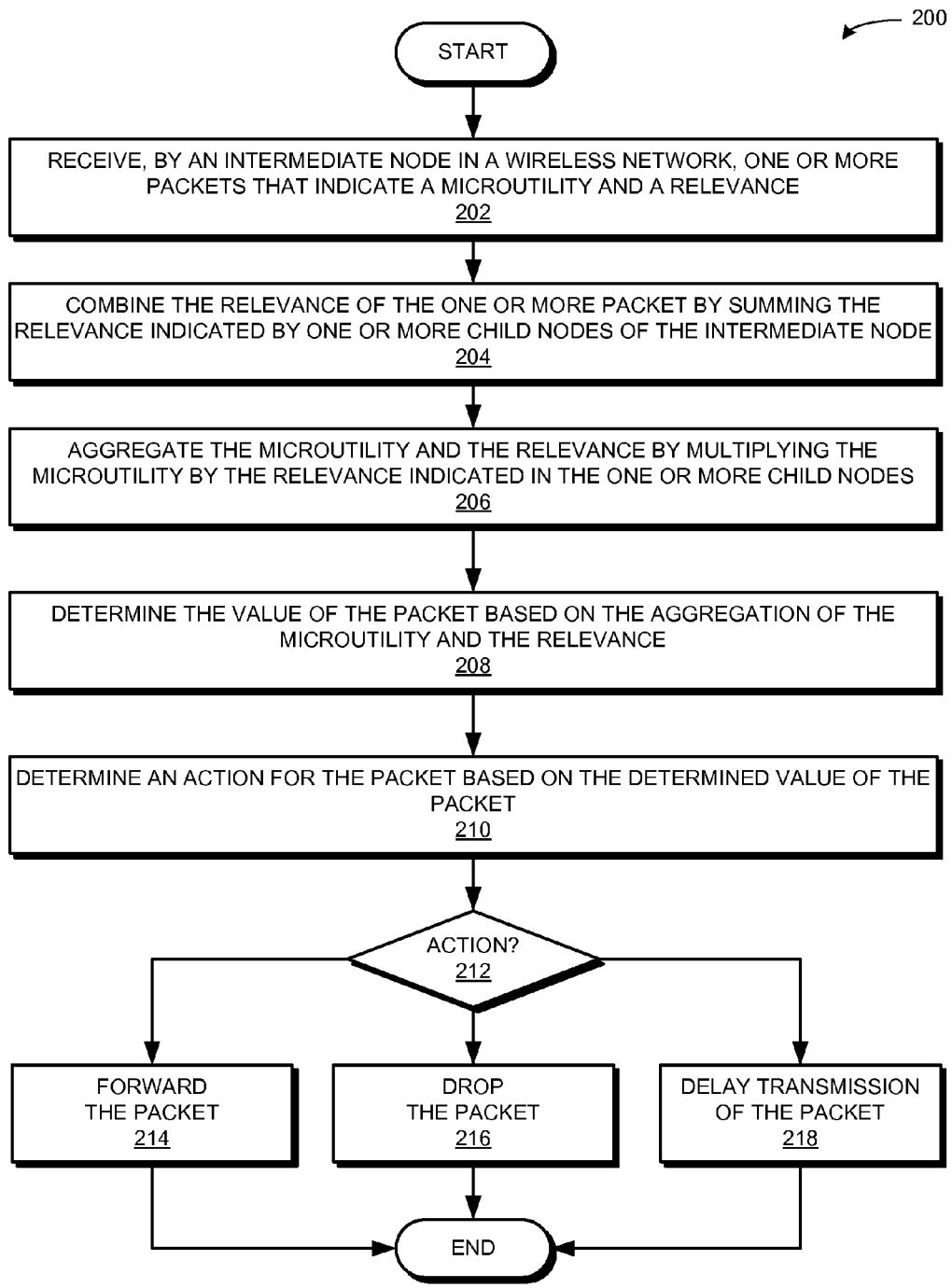
FIG. 2A presents a flowchart illustrating an exemplary routing process performed by an intermediate node in a MASNET, in accordance with an embodiment of the present invention.

FIG. 2A presents a flowchart 200 illustrating an exemplary routing process performed by an intermediate node in a MASNET, in accordance with an embodiment of the present invention. During operation, the system receives, by an intermediate node in a wireless network, one or more packets that indicate a microutility and a relevancy specification (operation 202). The intermediate node combines the relevancy specification of the one or more packets by summing the relevance indicated by one or more child nodes of the intermediate node (operation 204). In some embodiments, the intermediate node forwards the summed relevancy specification to an upstream next-hop node or an upstream content producing node. The system then aggregates the microutility and the relevancy specification indicated in the one or more packets by multiplying the microutility by the relevance indicated in the one or more child nodes of the intermediate node (operation 208). The intermediate node then determines the value of the packet based on the aggregation of the microutility and the relevancy specification (operation 208). The system determines an action for the packet based on the determined value of the packet (operation 210). Based on the determined action (decision 212), the intermediate node can forward the packet to a next-hop node (operation 214), e.g., if there is no congestion in the network or if the packet is designated as a high priority packet by a downstream next-hop node. The intermediate node can also drop the packet (operation 216), e.g., if there is congestion in the network or a low value relevancy specification indicated for a child node or downstream next-hop node. The intermediate node can further delay transmission of the packet (operation 218), e.g., if there is congestion in the network but the relevancy specification indicates a high priority for the packet.

Figure 2B:
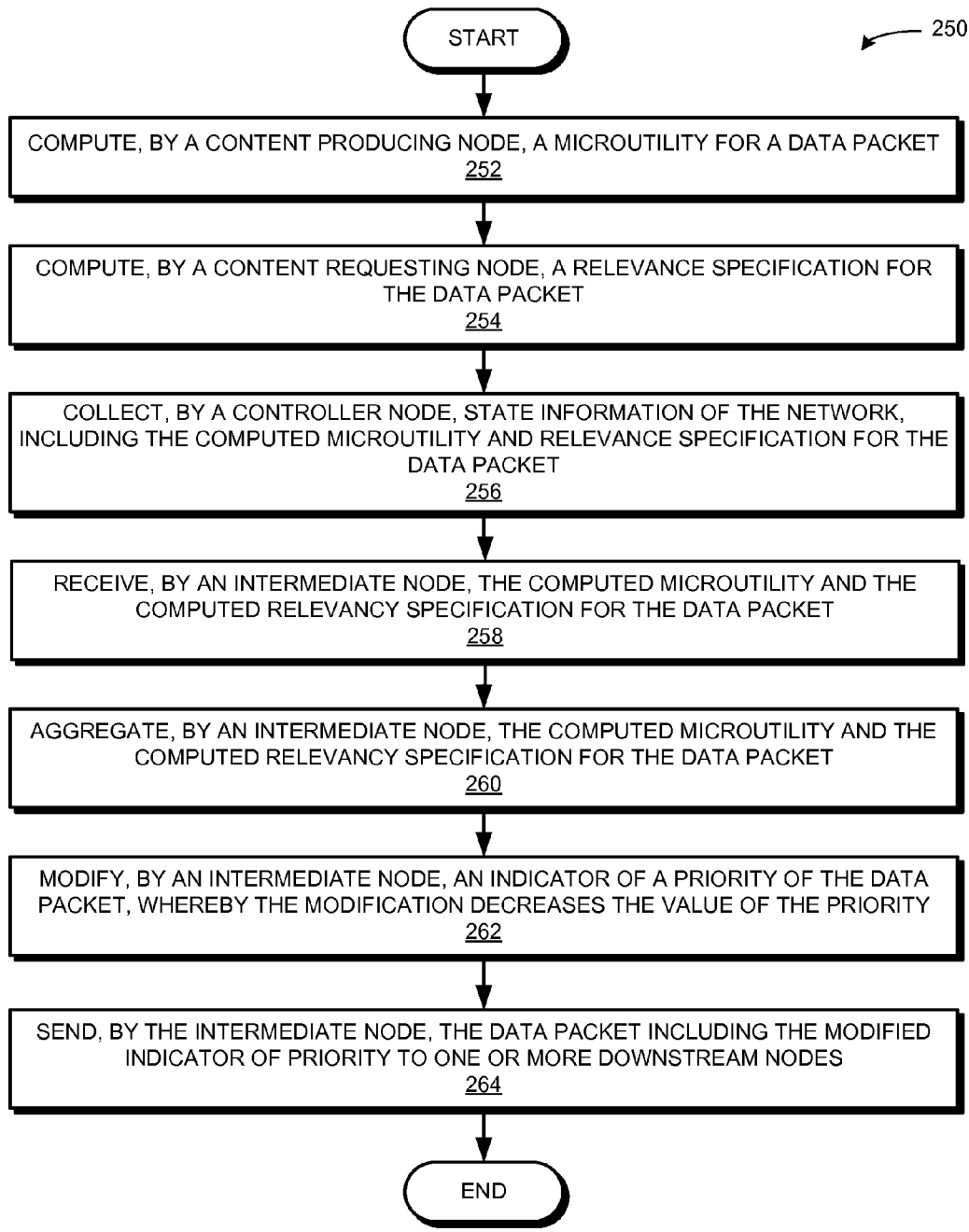
FIG. 2B presents a flowchart illustrating an exemplary routing process performed by the system in a MASNET, in accordance with an embodiment of the present invention.

FIG. 2B presents a flowchart 250 illustrating an exemplary routing process performed by the system in a MASNET, in accordance with an embodiment of the present invention. During operation, a content producing node computes a microutility for a data packet (operation 252). This microutility can be based on equation (1) and is propagated downstream from a content producer to a content requester, passing through various intermediate or forwarder nodes. A content requesting node computes a relevancy specification for the data packet (operation 254). This relevancy specification can be based on equation (2) and is propagated upstream from a content requester to a content producer, passing through the same intermediate or forwarder nodes in a reverse path as the microutility. A controller node collects state information of the network, including the computed microutility and relevancy specification for the data packet (operation 256). In some embodiments, the relevancy specification collected by the controller node includes the summation indicated by the relevancy specification of all child nodes along a particular network path. The system receives, by an intermediate node, the computed microutility and the computed relevancy specification for the data packet (operation 258). The intermediate node performs a data aggregation computation on the received microutility and relevancy specification (operation 260). In some embodiments, the aggregation is computed by multiplying the microutility by the relevancy specification indicated by one or more child nodes of the intermediate node.

The intermediate node then modifies an indicator of the priority of the data packet, where the modification decreases the value of the priority (operation 262). As explained in relation to FIG. 1B, the priority of a data packet transmitted downstream from a content producer node to a content subscriber node continues to decreases as it travels hop-by-hop through the MASNET. Finally, the intermediate node transmits the data packet including the modified indicator of priority to one or more downstream nodes (operation 264).

Routing of Packets without and with Dynamic QoS

Figure 3A:
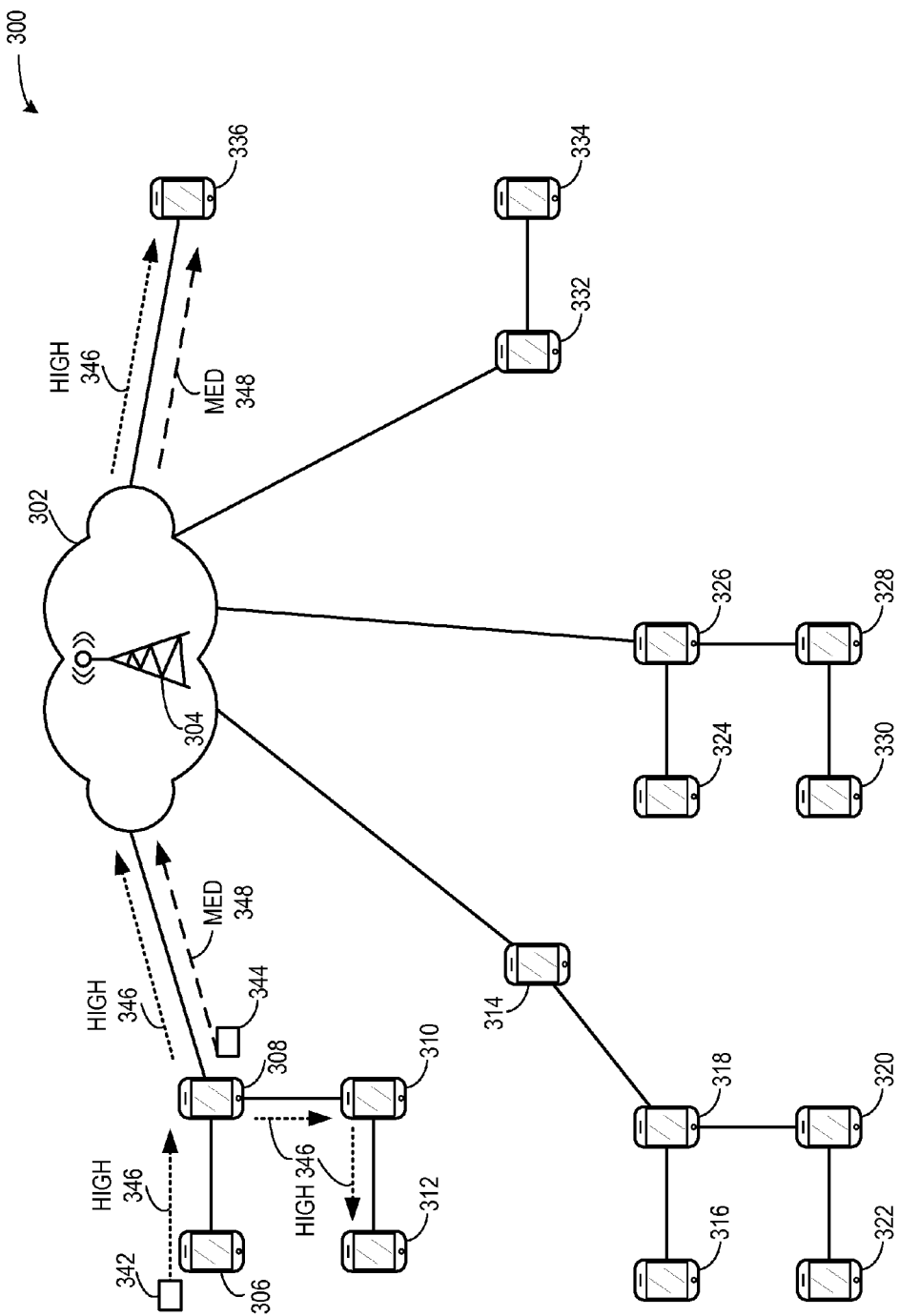
FIG. 3A presents a diagram illustrating an exemplary mobile ad hoc network (MANET), including the routing of a packet without a dynamic Quality of Service (QoS) marker.

FIG. 3A presents a diagram illustrating an exemplary mobile ad hoc network (MANET) 300, including the routing of a packet without a dynamic Quality of Service (QoS) marker. Network 300 can include a base station network 302 and a set of mobile network nodes 306-336. More specifically, base station network 302 can include one or more base station nodes, such as a base station node 304, which communicate with each other via a wired or wireless network. At least some of mobile nodes 306-336 can communicate with base station network 302 over a wireless network, either directly or via a multi-hop path. network 300 has an architecture like that used in IP subnets and MANET channels where the topology is relatively static. For example, using IP Quality of Service (QoS) markers, an application operating at a mobile node can specify only a simple, unchanging priority for data packets. In other words, data packets transmitted across network 300 have static priorities. An application in network 300 requiring dynamic priorities for a data packet based on, e.g., the destination of the packet, needs to create multiple data streams with differing priorities. Alternatively, the system can implement application-specific rules and place these rules in the configuration files of each affected network element. Without these workarounds, traffic may be classified incorrectly or inaccurately in network 300.

During operation, if mobile node 306 wishes to send a packet 342 of high priority (indicated by a high 346 priority) to mobile node 312, packet 342 travels from mobile node 306 to mobile node 308 to mobile node 310, and finally reaches mobile node 312. Furthermore, because there is only one multicast stream, when packet 342 reaches mobile node 308, the system also sends packet 342 through base station network 302 to mobile node 336 (indicated by the high 346 priority). Packet 342 retains the same priority in traveling to and reaching both of mobile nodes 312 and 336. At the same time, if mobile node 308 wishes to send a packet 344 of medium priority (indicated by a medium 348 priority) to mobile node 336, packet 344 travels from mobile node 308 to base station network 302 and on to mobile node 336.

However, in the case where packet 342 is meant for high priority only to mobile node 312 and is meant only as low priority for mobile node 336, the stream of packet 342 with high 346 priority from mobile node 308 to mobile node 336 contends with the stream of packet 344 with medium 348 priority on the same path (from mobile node 308 to mobile node 336). In other words, the high priority of packet 342 takes precedence over the medium priority of packet 344. Since there is only one multicast stream, the stream of packet 344 can be mis-categorized on the link over base station network 302. Furthermore, part of the medium priority stream of packet 344 may be improperly dropped.

Figure 3B:
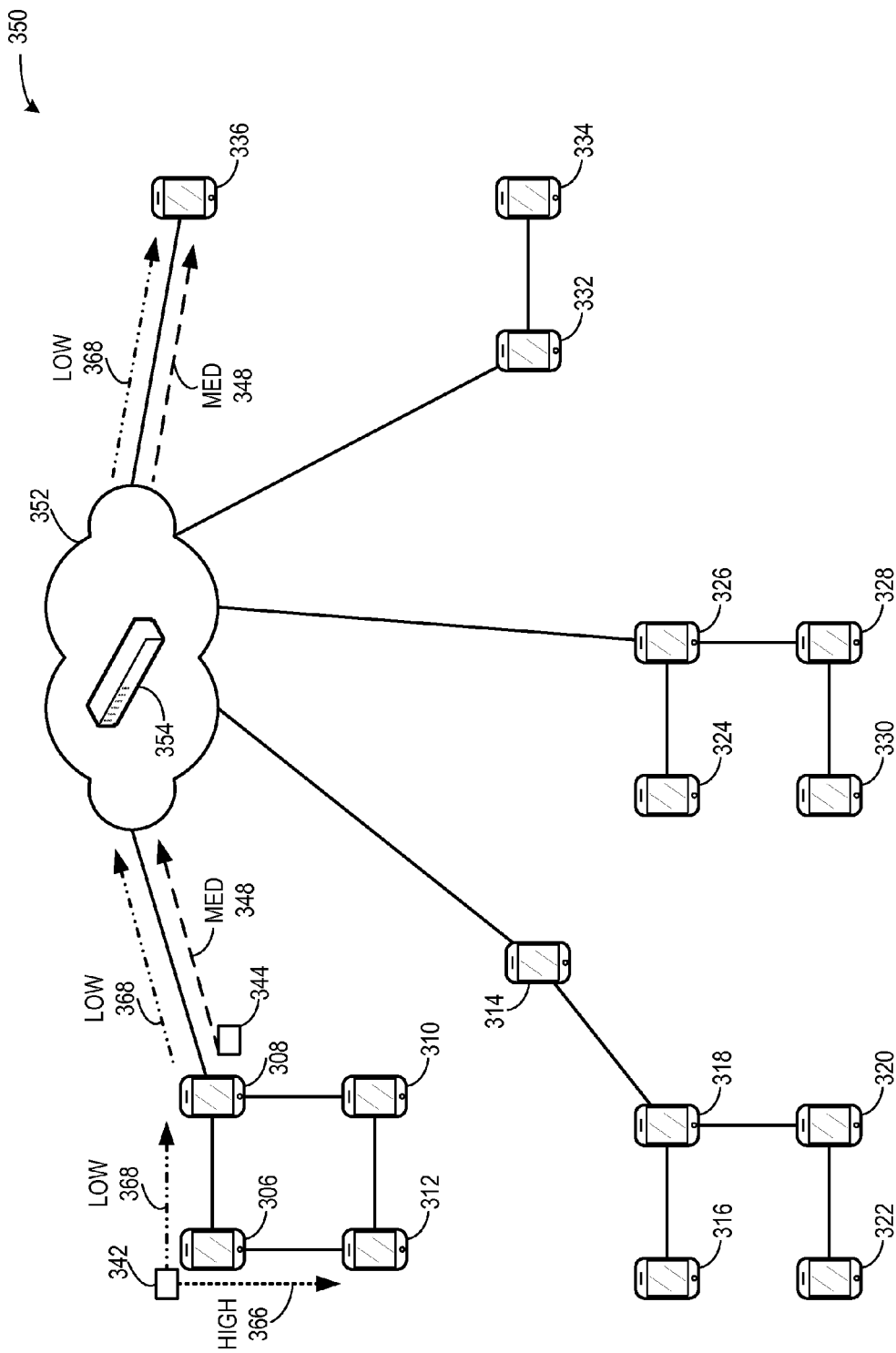
FIG. 3B presents a diagram illustrating an exemplary mobile application specific network (MASNET) that uses a utility-based cross layering (UBCL) mechanism, including the routing of a packet with a dynamic QoS marker, in accordance with an embodiment of the present invention.

FIG. 3B presents a diagram illustrating an exemplary mobile application specific network (MASNET) 350 that uses a utility-based cross layering (UBCL) mechanism, including the routing of a packet with a dynamic QoS marker, in accordance with an embodiment of the present invention. MASNET 350 can include a backbone cloud 352 (hereinafter referred to as "backbone 352") and a set of mobile network nodes 306-336. More specifically, backbone 352 can include one or more controller nodes, such as a controller node 354, which communicate with each other via a wired or wireless network. At least some of the mobile nodes 306-336 can communicate with backbone cloud 352 over a wireless network, either directly or via a multi-hop path. During operation, controller node 354 collects state information relating to mobile nodes 306-336 in MASNET 350, including the application-specific need of mobile node 306 to send a packet 342 of high priority to mobile node 312. Based on the collected state information, controller node 354 performs two actions: 1) applies a utility-based mechanism (e.g., UBCL) to allocate the network elements; and ii) reconfigures network 350 to achieve the applied utility mechanism (e.g., UBCL). For example, controller node 354 can apply UBCL and assign a packet with a dynamic microutility such that the priority of the packet changes as the packet travels through network 350 based on the receiving mobile node.

In FIG. 3B, when mobile node 306 sends packet 342 of high priority to mobile node 312, an application-specific utility function labels packet 342 to inform network 350 that packet 342 is high priority for mobile node 312 (indicated by a high 366 priority), but only low priority for mobile node 336 (indicated by a low 368 priority). In this manner, because the priority of packet 342 is dynamically and accurately re-labeled in the link from mobile node 308 to mobile node 336, the low 368 priority stream of packet 342 does not contend with the medium 348 priority stream of packet 344 between mobile node 308 and mobile node 336.

Thus, medium priority packet 344 is correctly classified and reaches mobile node 336 without being improperly dropped. Furthermore, in response to applying a utility-based mechanism, controller node 354 can reconfigure the network such that there is an SDM link directly between mobile node 306 and mobile node 312, allowing for more efficient flow of traffic from mobile node 306 to mobile node 312.

Figure 4:
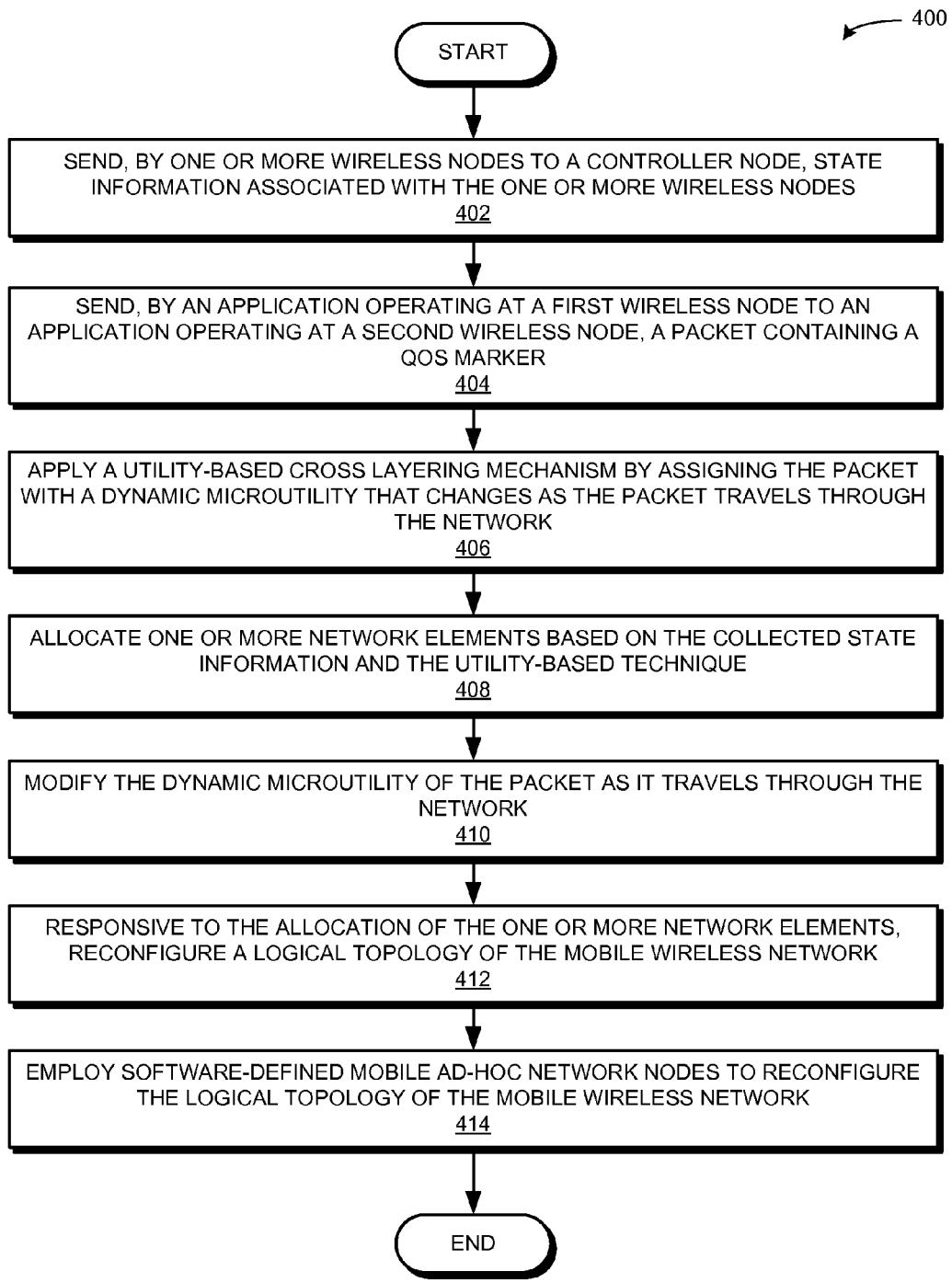
FIG. 4 presents a flowchart illustrating an exemplary routing process performed by a system using a utility-based cross layering (UBCL) mechanism, including the routing of packet containing a dynamic Quality of Service (QoS) marker, in accordance with an embodiment of the present invention.

FIG. 4 presents a flowchart 400 illustrating an exemplary routing process performed by a system using a utility-based cross layering (UBCL) mechanism, including the routing of packet containing a dynamic Quality of Service (QoS) marker, in accordance with an embodiment of the present invention. During operation, the system sends, by one or more wireless nodes to a controller node, state information associated with the one or more wireless nodes in a mobile wireless network (operation 402). An application operating at a first wireless node sends to an application operating at a second wireless node a packet containing a QoS marker indicating a level of priority for the packet (operation 404). The system applies a utility-based cross layering (UBCL) mechanism by assigning the packet with a dynamic microutility which changes as the packet travels through the network (operation 406). The system, by the controller node, allocates one or more network elements based on the collected state information and the utility-based technique (operation 408). The system further modifies the dynamic microutility of the packet as it travels through the network (operation 410). Responsive to the allocation of the network elements, the controller node reconfigures a logical topology of the network (operation 412) and employs software-defined mobile ad hoc network nodes to reconfigure the logical topology of the mobile wireless network (operation 414).

Exemplary Computer and Communication System

Figure 5:
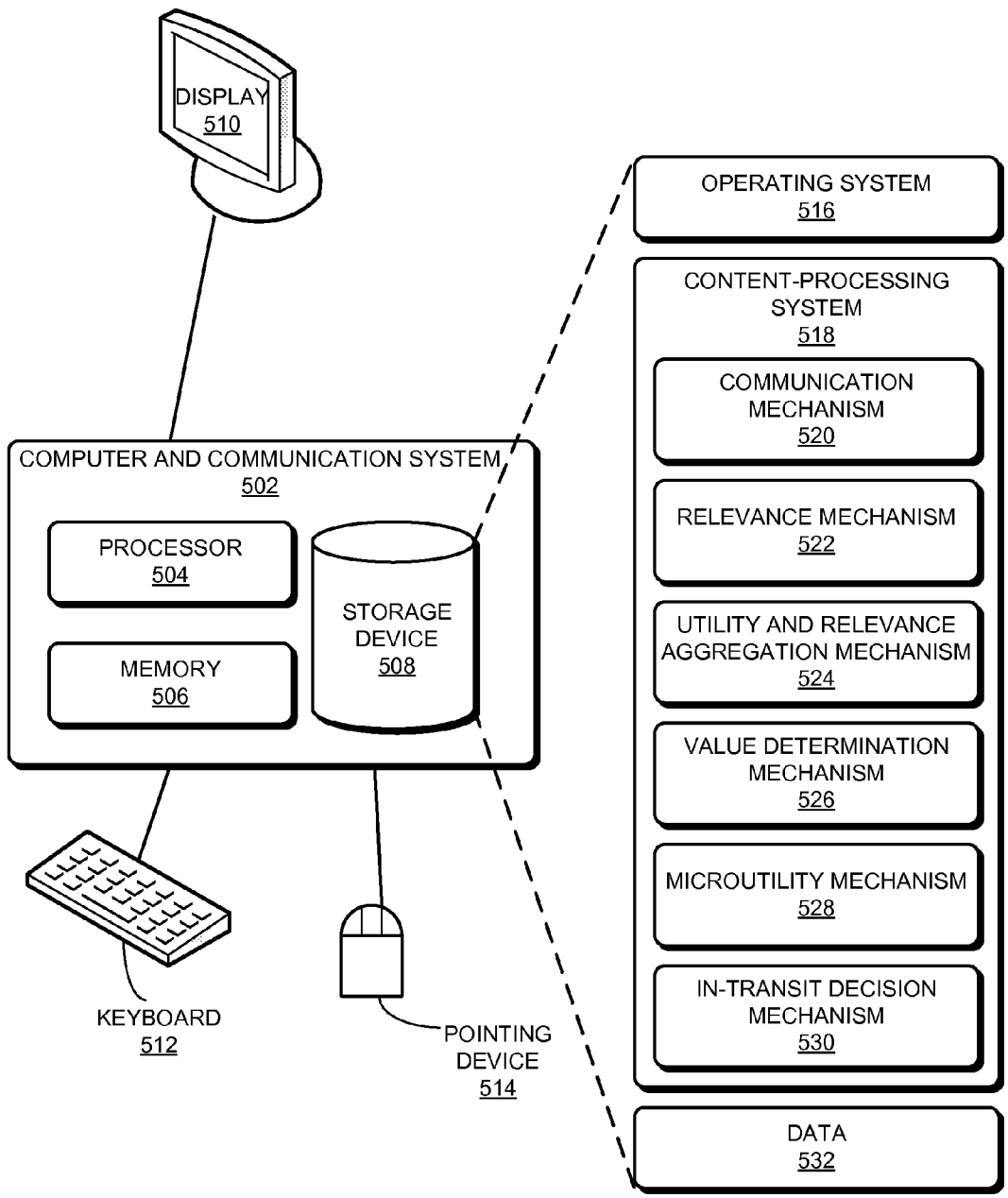
FIG. 5 illustrates an exemplary computer and communication system that facilitates a large-scale mobile ad hoc network to adapt to specific application needs of wireless nodes, in accordance with an embodiment of the present invention.

FIG. 5 illustrates an exemplary computer and communication system 502 that facilitates a large-scale mobile ad hoc network to adapt to specific application needs of wireless nodes, in accordance with an embodiment of the present invention. Computer and communication system 502 includes a processor 504, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 516, a content-processing system 518, and data 532.

Content-processing system 518 can include instructions, which when executed by computer and communication system 502, can cause computer and communication system 502 to perform methods and/or processes described in this disclosure. Specifically, content-processing system 518 may include instructions for receiving, by an intermediate node, one or more packets that indicate a microutility and a relevance, where the microutility is based on a utility function specific to an application, and where the relevance indicates a priority of the one or more packets (communication mechanism 520). Content-processing system 518 can also include instructions for combining the relevancy specification of the one or more packets (relevance mechanism 522). Content-processing system 518 can include instructions for aggregating the microutility and the relevance of the one or more packets (utility and relevance aggregation mechanism 524). Content-processing system 518 can also include instructions for determining the value of the one or more packets based on the aggregation of the microutility and the relevance (value determination mechanism 526).

Content-processing system 518 can further include instructions for computing, by a content producing node, the microutility for the one or more packets, where the microutility is based on a utility function specific to an application operating at the content producing node (microutility mechanism 528). Content-processing system 518 can include instructions for computing, by a content requesting node, the relevance for the one or more packets, where the relevance further indicates the importance of the one or more packets to the content requesting node (relevance mechanism 522).

Content-processing system 518 can additionally include instructions for, responsive to determining one or more child nodes of an intermediate node, where the one or more child nodes each indicate a relevance corresponding to the one or more packets, summing the relevance indicated by the one or more child nodes (relevance mechanism 522). Content-processing system 518 can include instructions for transmitting the one or more packets to an upstream content producing node, where the one or more packets include the summed relevance indicated by the one or more child nodes (communication mechanism 520). Content-processing system 518 can include instructions for, responsive to determining one or more child nodes of an intermediate node, where the one or more child nodes each indicate a relevance corresponding to the one or more packets, multiplying the microutility by the relevance indicated by the one or more child nodes (utility and relevance aggregation mechanism 524).

Content-processing system 518 can further include instructions for determining an action for the one or more packets based on the determined value of a respective packet, where the action is one of: forwarding the respective packet; dropping the respective packet; and delaying transmission of the respective packet (in-transit decision mechanism 530). Content-processing system 518 can include instructions for modifying an indicator of a priority of the one or more packets, where the modification decreases the value of the priority (value determination mechanism 526). Content-processing system 518 can include instructions for sending the one or more packets to one or more downstream nodes, where the one or more packets include the modified indicator of the priority of a respective packet (communication mechanism 520).

Data 532 can include any data that is required as input or that is generated as output by the methods and/or processes described in this disclosure. Specifically, data 532 can store at least: a packet; a packet that indicates a microutility and a relevance, where the microutility is based on a utility function specific to an application and the relevance indicates a priority of a packet; a computation of microutilitiy that is based on a utility function specific to an application operating at a content producing node; a computation of relevance that indicates the importance of one or more packets to a content requesting node; information relating to a controller node, a content requesting node, a content producing node, an intermediate node, and a forwarder node; an indicator of a combined relevance for one or more packets; an indicator of a combined relevance that includes a value representing the sum of the relevance associated with all child nodes of an intermediate node; an indicator of an aggregated value of microutility and relevance for one or more packets; an indicator of an aggregated value of microutility and relevance that includes a value representing the multiplication of the microutility by the relevance indicated by one or more child nodes; a determined value of a respective packet based on the aggregation; an indicator of an action for an in-transit decision to be made by an intermediate node, including forwarding, dropping, or delaying transmission of a respective packet; and an indicator of a modified priority of a respective packet, where the modification decreases a value of the priority.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for routing in a mobile wireless network, comprising:

receiving, by an intermediate node, a relevancy specification from one or more child nodes, wherein the relevancy specification is computed by the one or more child nodes and indicates an importance to each of the one or more child nodes of receiving one or more packets;

combining the relevancy specification received from the one or more child nodes for the one or more packets;

receiving the one or more packets, wherein the one or more packets indicate a microutility computed by a content producing node, wherein the microutility is based on a utility function specific to an application operating at the content producing node;

aggregating the microutility and the combined relevancy specification for the one or more packets;

determining a value of the one or more packets based on the aggregation of the microutility and the combined relevancy specification; and determining an action for the one or more packets based on the determined value of a respective packet, thereby facilitating a large-scale mobile ad hoc network to adapt to specific application needs of wireless nodes.

2. The method of claim 1, further comprising:
computing, by a content requesting node, the relevancy specification for the one or more packets, wherein the relevancy specification further indicates an importance of the one or more packets to the content requesting node.

3. The method of claim 2, wherein the content requesting node is a child node of the intermediate node.

4. The method of claim 1, wherein combining the relevancy specification of the one or more packets further comprises:
responsive to determining the one or more child nodes of the intermediate node, wherein the one or more child nodes each indicate a designated relevancy specification corresponding to the one or more packets, summing the designated relevancy specification indicated by the one or more child nodes.

5. The method of claim 1, further comprising:
transmitting the combined relevancy specification to an upstream content producing node.

6. The method of claim 1, wherein aggregating the microutility and the combined relevancy specification for the one or more packets further comprises:
responsive to determining the one or more child nodes of the intermediate node, wherein the one or more child nodes each indicate a designated relevancy specification corresponding to the one or more packets, multiplying the microutility by the designated relevancy specification indicated by the one or more child nodes.

7. The method of claim 1, wherein determining the value of the one or more packets further comprises:
modifying an indicator of a priority of the one or more packets, wherein the modification decreases the value of the priority;
sending the one or more packets to one or more downstream nodes, wherein the one or more packets include the modified indicator of the priority of a respective packet.

8. The method of claim 1, wherein the determined action for the one or more packets is one of:
forwarding the respective packet;
dropping the respective packet; and
delaying transmission of the respective packet.

9. A computer system for facilitating routing in a mobile wireless network, the system comprising:
a processor; and
a storage device storing instructions that when executed by the processor cause the processor to perform a method, the method comprising:
receiving, by an intermediate node, a relevancy specification from one or more child nodes, wherein the relevancy specification is computed by the one or more child nodes and indicates an importance to each of the one or more child nodes of receiving one or more packets;
combining the relevancy specification received from the one or more child nodes for the one or more packets;
receiving the one or more packets, wherein the one or more packets indicate a microutility computed by a content producing node, wherein the microutility is based on a utility function specific to an application operating at the content producing node;
aggregating the microutility and the combined relevancy specification for the one or more packets;
determining a value of the one or more packets based on the aggregation of the microutility and the combined relevancy specification; and
determining an action for the one or more packets based on the determined value of a respective packet, thereby facilitating a large-scale mobile ad hoc network to adapt to specific application needs of wireless nodes.

10. The computer system of claim 9, wherein the method further comprises:
computing, by a content requesting node, the relevancy specification for the one or more packets, wherein the relevancy specification further indicates an importance of the one or more packets to the content requesting node.

11. The computer system of claim 10, wherein the content requesting node is a child node of the intermediate node.

12. The computer system of claim 9, wherein combining the relevancy specification of the one or more packets further comprises:
responsive to determining the one or more child nodes of the intermediate node, wherein the one or more child nodes each indicate a designated relevancy specification corresponding to the one or more packets, summing the designated relevancy specification indicated by the one or more child nodes.

13. The computer system of claim 9, wherein the method further comprises:
transmitting the combined relevancy specification to an upstream content producing node.

14. The computer system of claim 9, wherein aggregating the microutility and the combined relevancy specification for the one or more packets further comprises:
responsive to determining the one or more child nodes of the intermediate node, wherein the one or more child nodes each indicate a designated relevancy specification corresponding to the one or more packets, multiplying the microutility by the designated relevancy specification indicated by the one or more child nodes.

15. The computer system of claim 9, wherein determining the value of the one or more packets further comprises:
modifying an indicator of a priority of the one or more packets, wherein the modification decreases the value of the priority;
sending the one or more packets to one or more downstream nodes, wherein the one or more packets include the modified indicator of the priority of a respective packet.

16. The computer system of claim 9, wherein the determined action for the one or more packets is one of:
forwarding the respective packet;
dropping the respective packet; and
delaying transmission of the respective packet.

17. A non-transitory computer-readable storage medium storing instructions that when executed by a computing device cause the computing device to perform a method for routing in a mobile wireless network, the method comprising:
receiving, by an intermediate node, a relevancy specification from one or more child nodes, wherein the relevancy specification is computed by the one or more child nodes and indicates an importance to each of the one or more child nodes of receiving one or more packets;
combining the relevancy specification received from the one or more child nodes for the one or more packets;

receiving the one or more packets, wherein the one or more packets indicate a microutility computed by a content producing node, wherein the microutility is based on a utility function specific to an application operating at the content producing node;

aggregating the microutility and the combined relevancy specification for the one or more packets;

determining a value of the one or more packets based on the aggregation of the microutility and the combined relevancy specification; and determining an action for the one or more packets based on the determined value of a respective packet, thereby facilitating a large-scale mobile ad hoc network to adapt to specific application needs of wireless nodes.

18. The storage medium of claim 17, wherein the method further comprises:

computing, by a content requesting node, the relevancy specification for the one or more packets, wherein the relevancy specification further indicates an importance of the one or more packets to the content requesting node.

19. The storage medium of claim 18, wherein the content requesting node is a child node of the intermediate node.

20. The storage medium of claim 17, wherein combining the relevancy specification of the one or more packets further comprises:

responsive to determining the one or more child nodes of the intermediate node, wherein the one or more child nodes each indicate a designated relevancy specification corresponding to the one or more packets, summing the designated relevancy specification indicated by the one or more child nodes.

21. The storage medium of claim 17, wherein the method further comprises:

transmitting the combined relevancy specification to an upstream content producing node.

22. The storage medium of claim 17, wherein aggregating the microutility and the combined relevancy specification for the one or more packets further comprises:

responsive to determining the one or more child nodes of the intermediate node, wherein the one or more child nodes each indicate a designated relevancy specification corresponding to the one or more packets, multiplying the microutility by the designated relevancy specification indicated by the one or more child nodes.

23. The storage medium of claim 17, wherein determining the value of the one or more packets further comprises:

modifying an indicator of a priority of the one or more packets, wherein the modification decreases the value of the priority;

sending the one or more packets to one or more downstream nodes, wherein the one or more packets include the modified indicator of the priority of a respective packet.

24. The storage medium of claim 17, wherein the determined action for the one or more packets is one of:

forwarding the respective packet;
dropping the respective packet; and
delaying transmission of the respective packet.

* * * * *